(No Model.)
W. TODD.
BICYCLE.
No. 575,815. Patented Jan. 26, 1897.
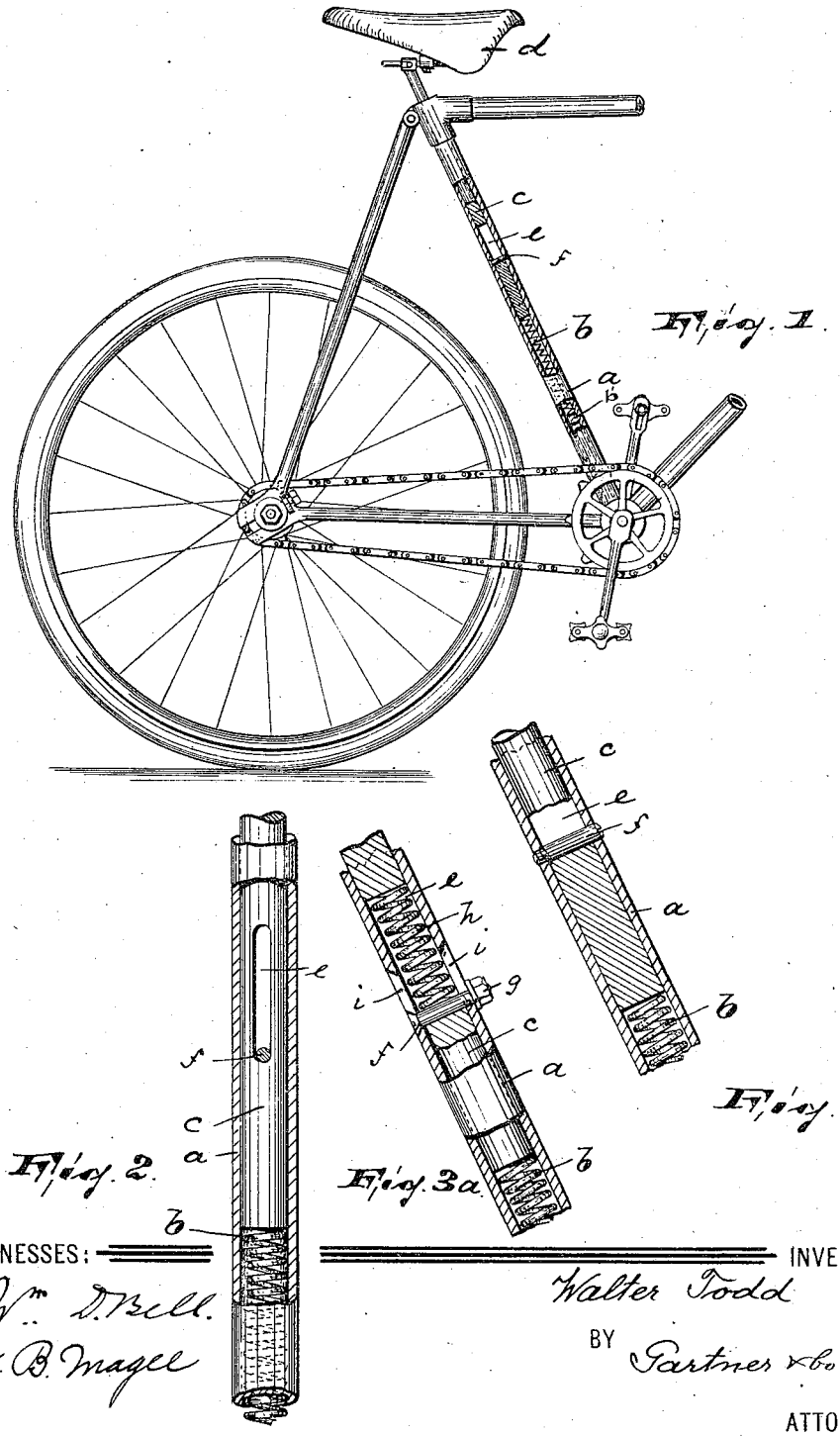
WITNESSES:
Wm. D. Bell.
W. B. Magee
INVENTOR
Walter Todd
BY Gartner & Co.
ATTORNEYS.

UNITED STATES PATENT OFFICE.

WALTER TODD, OF PATERSON, NEW JERSEY.

BICYCLE.

SPECIFICATION forming part of Letters Patent No. 575,815, dated January 26, 1897.

Application filed June 29, 1896. Serial No. 597,329. (No model.)

*To all whom it may concern:*

Be it known that I, WALTER TODD, a citizen of the United States, residing in Paterson, county of Passaic, and State of New Jersey, have invented certain new and useful Improvements in Bicycles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of my present invention is to provide a bicycle with a saddle-post having a sliding motion in the direction of the diagonal of the diamond frame to thus equalize the weight upon the front and rear wheel while riding, especially over uneven roads, crosswalks, car-tracks, &c., of simple, strong, and durable construction and light in weight.

The invention consists in the improved spring-controlled sliding saddle-post, its connection with the diagonal of a bicycle, and in the combination and arrangement of the various parts thereof, substantially as will be hereinafter more fully described and claimed.

In the accompanying drawings, Figure 1 represents a side elevation, partly in section, of a portion of a bicycle provided with my improvement; Figs. 2 amd 3, enlarged detail views illustrating the connection between the saddle-post and the diagonal, and Fig. 3ª a detail view of a slight modification thereof.

In said drawings, $a$ represents the diagonal of an ordinary bicycle, and $b$ a spiral spring arranged therein and resting with its lower end on the stop $b'$, (in said diagonal,) as clearly shown. The saddle-post $c$, to which the saddle $d$ is secured in any desired manner, is arranged in said diagonal and rests on the upper end of the said spiral spring $b$.

The saddle-post is provided with an elongated slot $e$, penetrated by the pin $f$, arranged at substantially right angle and secured to the diagonal by screw-thread connection, as in Fig. 3, or by a nut $g$, as in Fig. 3ª. In normal position the pin $f$ bears against the lower end of the elongated slot $e$, the spring being so adjusted as to counterbalance the weight of the rider; that is to say, after the rider has mounted the spring will be sufficiently depressed to clear the pin $f$ from its bearing on the lower end of the slot. In Fig. 3ª of the drawings a spiral spring $h$ is also inserted within the slot of the saddle-post and bears with its upper end against the upper end of the slot and with its lower end against the pin $f$, by which arrangement the sliding movement of the saddle-post is reduced, and the weight of the rider is thus divided up upon the two spiral springs $b$ and $h$. The diagonal $a$ is also provided with slots $i$, arranged diametrically opposite and in alinement with the slot $e$ in the saddle-post, and thus allows an adjustment of the pin $f$, and thus of the spiral spring $b$. The higher the pin $f$ is secured in the diagonal the less the compression upon the spring $b$.

Having thus described my invention, what I claim as new, and desire to secure by Letters Patent, is—

1. The combination with the diagonal of a bicycle, of a spiral spring in said diagonal, a longitudinally-slotted saddle-post slidingly arranged in said diagonal and resting on said spring, and a pin penetrating the slot in the saddle-post and adjustably secured in the diagonal to thus allow an adjustment of the spiral spring, substantially as described.

2. The combination with the diagonal of a bicycle, of a spiral spring in said diagonal, a saddle-post slidingly arranged in said diagonal and resting on the spiral spring, and provided with an elongated slot, a pin penetrating the slot and adjustably secured in the diagonal to thus allow an adjustment of the spiral spring, and a spiral spring within the slot and bearing on said pin, substantially as and for the purposes described.

3. The combination with the diagonal of a bicycle, of a spiral spring in said diagonal, a longitudinally-slotted saddle-post slidingly arranged in said diagonal, said diagonal being provided with slots arranged diametrically opposite and in alinement with the slot in the saddle-post, and a pin vertically adjustable in the slots of the diagonal and penetrating the slot in the saddle-post, all said parts, substantially as and for the purposes described.

4. The combination with the diagonal of a bicycle, of a spiral spring in said diagonal, a longitudinally-slotted saddle-post slidingly arranged in said diagonal, said diagonal being provided with slots arranged diametrically opposite and in alinement with the slot in the saddle-post, a pin vertically adjustable in the slot of the diagonal and penetrating the slot in the saddle-post, and a spiral spring in the slot of the saddle-post and bearing against its upper end and the penetrating pin respectively, all said parts, substantially as and for the purposes described.

In testimony that I claim the foregoing I have hereunto set my hand this 17th day of June, 1896.

WALTER TODD.

Witnesses:
ALFRED GARTNER,
WM. D. BELL.